United States Patent
Flat

(12) 
(10) Patent No.: US 6,387,976 B1
(45) Date of Patent: May 14, 2002

(54) STORAGE STABLE COMPOSITIONS FOR OBTAINING ELASTOMER COATINGS

(75) Inventor: Jean-Jacques Flat, Serquigny (FR)

(73) Assignee: Elf Atochem, S.A., Puteaux (FR)

( * ) Notice: Subject to any disclaimer, the term of this patent is extended or adjusted under 35 U.S.C. 154(b) by 0 days.

(21) Appl. No.: 09/445,479

(22) PCT Filed: Mar. 10, 1999

(86) PCT No.: PCT/FR99/00534

§ 371 Date: May 11, 2000

§ 102(e) Date: May 11, 2000

(87) PCT Pub. No.: WO99/46312

PCT Pub. Date: Sep. 16, 1999

(30) Foreign Application Priority Data

Mar. 12, 1998 (FR) ............................................. 98 03039

(51) Int. Cl.$^7$ .......................... C08F 2/50; C08G 18/28; C08L 75/14

(52) U.S. Cl. .......................... 522/96; 522/98; 522/142; 528/65

(58) Field of Search ............................ 522/96, 142, 93, 522/98; 528/65

(56) References Cited

U.S. PATENT DOCUMENTS

| | | | |
|---|---|---|---|
| 4,295,909 A | 10/1981 | Baccei | 156/307.3 |
| 4,587,201 A | 5/1986 | Morikawa et al. | 430/284 |
| 4,778,831 A | * 10/1988 | Kemper | |
| 5,013,811 A | * 5/1991 | Ross | |
| 5,589,543 A | * 12/1996 | Yokelson et al. | |

FOREIGN PATENT DOCUMENTS

| | | | |
|---|---|---|---|
| EP | 0 283 968 | 3/1988 | 18/69 |
| JP | 60-112648 | 6/1985 | |
| JP | 6-287249 | 10/1994 | 279/2 |

* cited by examiner

Primary Examiner—Susan W. Berman
(74) Attorney, Agent, or Firm—Smith, Gambrell & Russell LLP

(57) ABSTRACT

Compositions, which are stable on storage, which make it possible to obtain elastomer coatings. The compositions are obtained from a hydroxylated urethane prepolymer and from a mixture of acrylate monomer and oligomers, capable of giving an elastomer by thermal or photochemical radical polymerization; the urethane prepolymer being obtained by condensation of a conjugated diene oligomer comprising hydroxylated endings, optionally mixed with a chain extender, with a polyisocyanate compound. These compositions can be used in the protection of electrical and/or electronic components and generally as coatings for metal surfaces or for plastic surfaces.

11 Claims, No Drawings

STORAGE STABLE COMPOSITIONS FOR OBTAINING ELASTOMER COATINGS

FIELD OF THE INVENTION

The present invention relates to an elastomer obtained by radical polymerization of a liquid composition of low viscosity based on a hydroxylated diene oligomer.

BACKGROUND OF THE INVENTION

Liquid compositions of low viscosity based on polydiene with hydroxylated endings, on polymerization initiators and on reactive diluents comprising 2 or 3 (meth) acrylate groups per molecule and having a molar mass of 250 to 1000 g/mol are already known from JP-A-06 28 72 49. These compositions are thermally crosslinked to give polymers used as coating or adhesives. However, these polymers have the disadvantage of having brittle behaviour, of not being very elastomeric and of having very low resistances to folding and very low values of elongation at break.

DETAILED DESCRIPTION OF THE INVENTION

The aim of the present invention is to obtain a liquid composition of low viscosity based on a hydroxylated diene oligomer having good stability on storage. This composition must in particular be able to be used, without employing isocyanate, as coating for a metal surface or plastic surface. It must result, by thermal or photochemical radical polymerization, in an elastomer which does not exhibit the disadvantages reported above.

This aim is achieved by preparing first of all a hydroxylated prepolymer obtained by condensation of a diene oligomer comprising hydroxylated endings, optionally mixed with a chain extender, in particular a diol, with a polyisocyanate compound in a ratio by weight such that the ratio of the molar concentration of the isocyanate groups (—N=C=O) to the molar concentration of the hydroxyl groups (—OH) is from 0.05 to the value q; q being chosen so as not to achieve gelling of the prepolymer; this ratio being determined while taking into account the possible presence of the chain extender.

The prepolymer obtained comprises an unsaturated backbone of polydiene type, urethane groups connecting several carbonaceous backbones of the starting molecules and of hydroxylated diene oligomers. This prepolymer is randomly functionalized at the chain end by hydroxyl groups, because the polyisocyanate is reacted in amounts such that the isocyanate functional groups (—N=C=O) are in deficiency with respect to the hydroxyl groups present.

A composition based on this prepolymer which is stable on storage and which is capable of giving an elastomeric polymer by thermal or photochemical radical crosslinking is characterized by the content of the following constituents:

100 parts by weight of the urethane prepolymer obtained by condensation of a hydroxylated diene oligomer, optionally mixed with a chain extender, with a polyisocyanate compound in a ratio by weight such that the ratio of the molar concentration of the isocyanate groups (—N=C=O) to the molar concentration of the hydroxyl groups (—OH) is from 0.05 to the value q, this value q being chosen so as not to achieve gelling of the prepolymer, from 1 to 200 parts by weight of acrylate oligomers,
from 1 to 100 parts by weight of acrylate monomers,
from 0 to 100 parts by weight of plasticizers,
from 0 to 10 parts by weight of additives,
from 0.1 to 5 parts by weight of radical initiator.

This composition, which is stable under the usual storage conditions (from room temperature to 60° C., for example), has the advantage of resulting, after thermal or photochemical crosslinking, in an elastomeric polymer without the crosslinking proper requiring the addition of a polyisocyanate.

Thus, the final user of the composition will not himself have to use a polyisocyanate compound, which exhibits the advantage of not handling compounds of this type known for their toxicity.

The composition is preferably characterized in that the content of the constituents is:

100 parts by weight of the said urethane prepolymer,
from 50 to 100 parts by weight of acrylate oligomer(s),
from 10 to 50 parts by weight of acrylate monomer(s),
from 0 to 100 parts by weight of plasticizers,
from 0 to 5 parts by weight of additives,
from 0.1 to 5 parts by weight of radical initiator.

The gelling of the prepolymer is defined by the loss of its ability to flow.

The above constituents are defined in the following way:

a) the diene oligomers comprising hydroxylated endings, also known as polydienepolyols, which can be used according to the present invention comprise hydroxytelechelic conjugated diene oligomers which can be obtained by various processes.

Mention may be made, among these processes, of the radical polymerization of conjugated dienes having from 4 to 20 carbon atoms in the presence of hydrogen peroxide or optionally of an azo compound, such as 2,2'-azobis[2-methyl-N-(2-hydroxyethyl)propionamide], or alternatively the anionic polymerization of the conjugated diene having from 4 to 20 carbon atoms in the presence of formaldehyde or of ethylene oxide and of a basic catalyst, such as naphthalenelithium or sec-butyllithium.

According to the present invention, the conjugated diene for obtaining the polydienepolyol is chosen from the group comprising butadiene, isoprene, chloroprene, 1,3-pentadiene and cyclopentadiene. The number-average molar mass ($M_n$) of the polydienepolyols which can be used can be from 500 to 15,000 g/mol and is preferably from 1000 to 5000 g/mol.

Use is advantageously made of a polydiene based on butadiene. The polydienepolyol preferably has the following characteristics:

It comprises from 70 to 85 mol %, preferably 80 mol %, of $-(CH_2-CH=CH-CH_2)-$units and from 15 to 30 mol %, preferably 20 mol %, of

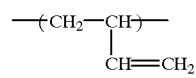

units.

Among polydienepolyols, hydroxylated copolymers of conjugated dienes and of vinyl and acrylic monomers, such as, for example, styrene and/or acrylonitrile, are also suitable.

It would not be departing from the invention if use were made of hydroxytelechelic butadiene oligomers epoxidized on the chain.

The polydienepolyols have a hydroxyl number, expressed in meq/g, of between 0.5 and 5 and their viscosity is between 1000 and 100,000 mPa·s at 30° C.

Mention may be made, as illustration of polydienepolyols which can be used in the present invention, of the polybutadienes comprising hydroxylated endings sold by the company Elf Atochem S.A. under the names Poly Bd® R-45HT and Poly Bd® R-20LM.

According to the present invention, the polyisocyanate compound used can be an aromatic, aliphatic or cycloaliphatic compound having at least two isocyanate functional groups in its molecule.

Mention may be made, as illustration of aromatic diisocyanate, of diphenylmethane 4,4'-diisocyanate (MDI), liquid modified MDIs, polymeric MDIs, toluene 2,4- and 2,6-diisocyanate (TDI) and their mixture, xylene diisocyanate (XDI), tetramethylxylene diisocyanate (TMXDI), paraphenylene diisocyanate (PPDI) or naphthalene diisocyanate (NDI).

Among aromatic diisocyanates, the invention preferably relates to diphenylmethane 4,4'-diisocyanate. In this specific case, the NCO/OH molar ratio is advantageously from 0.05 to 0.60.

Mention may be made, as illustration of aliphatic polyisocyanate, of hexamethylene diisocyanate (HDI) and its derivatives (isocyanate, biruet) or trimethylhexamethylene diisocyanate (HMDI).

Mention may be made, as illustration of cycloaliphatic polyisocyanate, of isophorone diisocyanate (IPDI) and its derivatives, dicyclohexylmethane 4,4'-diisocyanate ($H_{12}$MDI) and cyclohexyl diisocyanate (CHDI).

According to the invention, the chain extender can be chosen from diols. Their molecular mass can be between 62 and 500 g/mol.

Mention will be made, as illustration of such compounds, of ethylene glycol, propylene glycol, diethylene glycol, dipropylene glycol, 1,4-butanediol, 1,6-hexanediol, 2-ethyl-1,3-hexanediol, N,N-bis(2-hydroxypropyl)aniline, 3-methyl-1,5-pentanediol and the mixture of at least two of the abovementioned compounds.

The diol or the mixture of at least two of these diols can advantageously be present at up to 50 parts by weight.

Polyamines can also be used as chain extenders. Their molecular mass can be between 60 and 500 g/mol.

Mention will be made, as illustration of such polyamines, of ethylenediamine, diphenylmethanediamine, isophoronediamine, hexamethylenediamine or diethyltoluenediamine.

The polyacrylate oligomers are advantageously chosen with number-average molar masses $M_n$ ranging from 100 to 5000 g/mol. These oligomers are, for example, urethane acrylates or epoxy acrylates.

The (meth)acrylate monomers are advantageously chosen from mono-, di-, tri- or tetrafunctional alkyl acrylates and methacrylates preferably having a boiling point greater than 150° C. at normal pressure, if thermal radical initiation is envisaged. The choice is preferably made from the monofunctional (meth)acrylates, isobornyl acrylate, isobornyl methacrylate, dicyclopentenyloxyethyl methacrylate, methoxyethyl acrylate, ethoxyethyl methacrylate, isooctyl acrylate, 2-ethylhexyl methacrylate, nonyl methacrylate, nonyl acrylate or lauryl methacrylate.

The plasticizers are advantageously chosen from dialkyl and alkyl benzyl phthalates, alkyl sebacates or alkyl adipates.

The additives can be conventional additives known to the person skilled in the art, such as antioxidants, UV stabilizers or radical stabilizers. The formulation can also optionally be charged with inorganic fillers known as such by a person skilled in the art. Mention may be made, as examples, of calcium carbonates, silica or kaolin. Pigments can also be added to the formulation.

The radical initiators can be conventional peroxides, the decomposition of-which and therefore the production of free radicals from which is provided by the thermal route, for example di-tert-butyl peroxide, dicumyl peroxide, tert-butyl perbenzoate or 2,5-dimethyl-2,5-bis(tert-butylperoxy)hexane, or two-component mixtures of peroxides and of coinitiators (for example, tertiary amines or cobalt salts), which produce free radicals at ambient temperature, or photoinitiator salts capable of generating free radicals under irradiation with ultraviolet radiation or by electron bombardment (Electron Beam (EB)).

Depending on the type of initiator used, the formulations according to the invention will be of the single-component (thermal or photochemical) or two-component (chemical) type.

The invention also relates to a process for the preparation of the composition, characterized in that the diene oligomer comprising hydroxyl endings, optionally mixed with the chain extender, is condensed with the polyisocyanate compound and then the other constituents are subsequently added in order to obtain the said liquid composition of low viscosity.

EXAMPLES

The present invention will be better understood by virtue of the following implementational examples, which are purely illustrative and without implied limitation.

Experimental Part

1) Constituents used and definitions of the abbreviations:

The polydienepolyol used is Poly Bd® R 45HT sold by the company Elf Atochem and of formula:

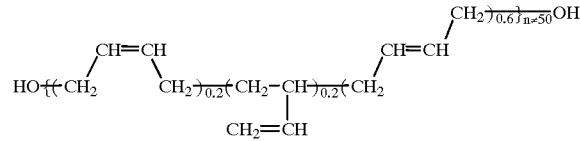

$M_n$=2800 g/mol

OH number=0.83 meq/g

Viscosity at 30° C.=5000 mPa·s.

TMPTMA is trimethylolpropane trimethacrylate (M=338 g/mol), sold by the company Elf Atochem.

TPGDA is tripropylene glycol diacrylate (M=300 g/mol), sold by the company Cray Valley.

Luperox P is tert-butyl perbenzoate, sold by the company Elf Atochem.

craynor 965 is a difunctional aliphatic urethane acrylate polyester oligomer having a viscosity of 20 to 30 Pa·s at 50° C., sold by the company Cray Valley.

ISOBORMA is isobornyl methacrylate (M=222 g/mol), sold by the company Elf Atochem.

DCPOEMA is dicyclopentenyloxyethyl methacrylate (M=262 g/mol), sold by the company Elf Atochem.

EHD is 2-ethyl-1,3-hexanediol, sold by the company Huls.

The MDI (diphenylmethane 4,4'-diisocyanate) used is the Isonate 125 grade sold by the company Dow.

DOA is dioctyl adipate, sold by the company Sidobre Sinova.

DBTL is dibutyltin dilaurate, sold by the company Air Products.

TBC is para-tert-butylcatechol.

DBPH is 2,5-dimethyl-2,5-bis (tert-butylperoxy)hexane, sold by the company Elf Atochem.

2) Characterization of the formulations and of the crosslinked materials a) Mechanical properties:

The elongation at break and the breaking stress of the crosslinked materials are determined according to DIN Standard 53504; the hardness of the materials is determined according to DIN Standard 53505.

b) Linear shrinkage during crosslinking:

It corresponds to the ratio (Lo-Lf)/Lo, expressed in %; Lo and Lf respectively being the dimensions before and after crosslinking of the material deposited in a mould having an internal dimension Lo.

c) Resistance to folding

It corresponds to the ability of a sheet with a thickness of 2 mm to undergo folding at 180° C. without damage.

d) Viscosity of the formulations

They are measured using a Brookfield type RVT, model DV3, viscometer equipped with a device which makes possible good control of the temperature.

e) Stability of the formulations

It corresponds to their ability not to gel during a heat treatment at 60° C. for 4 hours.

f) Mass losses

They correspond to the mass losses, expressed in %, either during a thermal ageing at 60° C. for 4 hours (on storage) or during the polymerization (1 hour at 160° C.).

g) Rheology

The glass transition temperature Tg (in ° C.), the tangent delta at the glass transition temperature Tg and the modulus of elasticity E' at 20° C. (Mpa) are determined on a Type RSA2 mechanical spectrometer, sold by the company Rheometrics.

The determinations are carried out on test specimens with dimensions of 22 mm×6 mm×2 mm, stressed under dynamic tension, with a pulsation of 10 rad/s, which corresponds to a frequency of 1.66 Hz.

The operations are carried out between —120° C. and +150° C. at the frequency as mentioned above.

The modulus E' at 20° C., the tgδ and the Tg are obtained from the curves.

h) Resistance to hydrolysis

Uptake in mass: it corresponds to the increase in the mass (express in %) of a test specimen during a wet ageing in water at 100° C. for 2 hours.

i) Electrical properties

The rigidity (kV/mm) is determined according to ASTM Standard D 419

The surface resistivity ($\Omega$) is determined according to ASTM Standard D 257

The volume resistivity ($\Omega$.cm) is determined according to ASTM Standard D 257

The permittivity (1 kHz) is determined according to ASTM Standard D 150.

The Tan delta value (1 kHz) is determined according to ASTM Standard D 150.

Example of the preparation of compositions according to the present invention a) Preparation Poly Bd® R 45HT is mixed with EHD and MDI according to the proportions described in Table I.

The condensation takes place in the following general way in order to result in a urethane prepolymer:

The diene oligomer comprising hydroxyl endings, optionally the short diol, and the polyisocyanate are mixed with stirring in a reactor at room temperature and then the mixture is kept stirring for one hour before being collected in the form of a urethane prepolymer. The other constituents are subsequently added in order to obtain the prepolymer-based composition according to the present invention.

The characteristics of Examples 1 to 3 of the urethane prepolymers thus prepared are collated in the following Table I.

TABLE I

| Prepolymers | A<br>Example 1<br>in parts<br>by weight | B<br>Example 2<br>in parts<br>by weight | C<br>Example 3<br>in parts by<br>weight |
|---|---|---|---|
| Poly Bd ® R 45HT | 100 | 100 | 100 |
| 2-Ethyl-1,3-hexanediol | 12.1 | 6.05 | 0 |
| MDI 125 | 14.1 | 9.37 | 4.68 |
| Viscosity at 30° C. (P) | 3260 | 2450 | 1670 |
| Viscosity at 60° C. (P) | 286 | 220 | 275 |

The six compositions which appear in the following Table II are prepared using the above three prepolymers A, B and C:

TABLE II

| $A_1$ | $A_2$ | $A_3$ | $A_4$ | $C_1$ | $C_2$ |
|---|---|---|---|---|---|
| 100 parts by of A | 100 parts by weight of A | 100 parts by weight of A | 100 parts by weight of A | 100 parts by weight of C | 100 parts by weight of B |
| 60 parts by weight of CRAYNOR 965 | 60 parts by weight of CRAYNOR 965 | 60 parts by weight of CRAYNOR 965 | 60 parts by weight of CRAYNOR 965 | 60 parts by weight of CRAYNOR 965 | 60 parts by weight of CRAYNOR 965 |
| 0.31 parts by weight of TBC | 20 parts by weight of ISOBORMA | 20 parts by weight of DCPOEMA | 20 parts by weight of DCPOEMA | 0.31 parts by weight of TBC | 0.31 parts by weight of TBC |
| 1.58 parts by weight of DBPH | 20 parts by weight of DOA | 20 parts by weight of DOA | 40 parts by weight of DOA | 1.58 parts by weight of DBPH | 1.58 parts by weight of DBPH |
| | 0.31 parts by weight of TBC | 0.31 parts by weight of TBC | 0.31 parts by weight of TBC | | |
| | 1.54 parts by weight of DBPH | 1.54 parts by weight of DBPH | 1.54 parts by weight of DBPH | | |

The six compositions $A_1$, $A_2$, $A_3$, $A_4$, $B_1$ and $C_1$ are crosslinked to give corresponding polymers poly $A_1$, poly $A_2$, poly $A_3$, and the like. The crosslinking is carried out by pouring the composition $A_n$ into a mould having an internal thickness of 2 mm, and by then placing the mould thus filled in a ventilated oven for one hour at 160° C.

By way of comparison, the following composition, produced according to the general teaching of JP-A-06287249, is prepared.

R: 100 parts by weight of Poly Bd®R 45HT 5 parts by weight of TMPTMA 25 parts by weight of TPGDA 1 part by weight of LUPEROX P 0.2 part by weight of para-butylcatechol 1 part by weight of diphenyl isodecyl phosphate Crosslinking is carried out at 160° C. for 1 h in order to give the polymer poly R.

The properties of the polymers obtained appear in the following Table III:

The compositions according to the invention can be used generally as coatings for metal surfaces or for plastic surfaces.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A composition consisting essentially of a urethane prepolymer which is stable on storage and which gives an elastomer by thermal or photochemical radical crosslinking, having a content including the following constituents expressed in terms of parts by weight relative to the total parts by weight of the following constituents:

100 parts by weight of the urethane prepolymer obtained by condensation of a diene oligomer having hydroxyl endings, optionally mixed with a chain extender, with

TABLE III

| Polymer | poly R | poly $A_1$ | poly $A_2$ | poly $A_3$ | poly $A_4$ | poly $B_1$ | poly $C_1$ |
|---|---|---|---|---|---|---|---|
| Stability on storage of the prepolymer composition | yes | yes | yes | yes | yes | yes | yes |
| Mechanical properties: | | | | | | | |
| Elongation (%) | <10 | 101 | 77 | 78 | 67 | 79 | 106 |
| Stress (MPa) | <0.3 | 2.08 | 1.29 | 1.26 | 0.69 | 1.16 | 0.77 |
| Hardness (Shore A) | 40 | 38 | 45 | 42 | 34 | 39 | 39 |
| Linear shrinkage (%) | 3 | 2.9 | 3.2 | 3.2 | 3.2 | 2.5 | 2.6 |
| Resistance to folding | no | yes | yes | yes | yes | yes | yes |
| Viscosity (60° C.) | 23 P | >100 P (at 20° C.) | 34 P | 42 P | 22 P | >100 P | >100 P |
| Mass loss | | | | | | | |
| on storage | — | — | 0.63% | 0.18% | — | — | — |
| on polymerization | — | — | 1.55 % | 0.87% | — | — | — |
| Rheology: | | | | | | | |
| Tg (° C.) | — | −63 | — | — | — | −62 | −66 |
| E' (20° C.) | — | 3 | — | — | — | 3 | 3 |
| Resistance to hydrolysis: | | | | | | | |
| uptake in mass | — | — | 0.31% | 0.35% | — | — | — |
| elongation after wet ageing | — | — | 84 | 67 | — | — | — |
| stress after wet ageing | — | — | 1.05 | 1.11 | — | — | — |
| Electrical properties: | | | | | | | |
| rigidity (kV/mm) | 21.5 | — | — | 20.1 | — | — | — |
| surf. resistivity | 3.5E + 15 | — | — | 6.7E + 1.4 | — | — | — |
| vol. resistivity | — | — | — | 4.5E + 13 | — | — | — |
| permittivity | 2.82 | — | — | 5.3 | — | — | — |
| Tan delta | 0.017 | — | — | 0.046 | — | — | — |

Table III clearly shows that the polymers obtained according to the invention are elastomers with elongations at break which can reach 100%, a good resistance to folding, a low glass transition temperature, necessary in order to retain good flexibility at low temperature, an excellent resistance to hydrolysis and good dielectric properties.

The compositions according to the invention can find, for example, applications in the field of the protection of electrical or electronic components against external assaults (thermal, mechanical, hydrolytic, environmental or chemical).

Mention may be made, as examples, of the electrical encapsulation of electrical circuits, the protection of splices or the varnishing of condenser-type windings.

a polyisocyanate compound in a ratio by weight such that the ratio of the molar concentration of the isocyanate groups (—N═C═O) to the molar concentration of the hydroxyl groups (—OH) is from 0.05 to q, this value q being selected so as not to achieve gelling of the prepolymer, from 1 to 200 parts by weight of acrylate oligomer(s), from 1 to 100 parts by weight of acrylate monomer(s), from 0 to 100 parts by weight of plasticizer(s), from 0 to 5 parts by weight of additive(s), and from 0.1 to 5 parts by weight of radical initator.

2. The composition according to claim 1, having a content including the following constituents:

100 parts by weight of the said urethane prepolymer,
from 50 to 100 parts by weight of acrylate oligomer(s), and
from 10 to 50 parts by weight of acrylate monomer(s).

3. The composition according to claim 1, wherein the chain extender is a diol.

4. The composition according to claim 3, wherein the diol can be present at up to 50 parts by weight.

5. The composition according to claim 1, wherein the polybutadiene comprising hydroxyl endings is a polydiene-polyol having the formula:

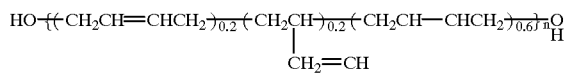

and wherein  n = about 50,
$M_n$ = about 2800 g/mol,
——OH number = about 0.83 meq/g, and
viscosity = about 5000 mPa·s at 30° C.

6. The composition according to claim 1, wherein the polyisocyanate compound is diphenylmethane 4,4'-diisocyanate (MDI).

7. The composition according to claim 6, wherein the ratio of the isocyanate group molar concentration to the hydroxyl group molar concentration is from 0.05 to 0.60.

8. A process for the preparation of the stable composition according to claim 1, wherein the diene oligomer having hydroxyl endings, optionally mixed with the chain extender, is condensed with the polyisocyanate compound and then the other constituents are subsequently added to obtain the said liquid composition of low viscosity.

9. An elastomeric polymer obtained by thermal or photochemical crosslinking of a composition according to claim 1.

10. A composition comprising a urethane prepolymer which is stable on storage and which gives an elastomer by thermal or photochemical radical crosslinking, having a content including the following constituents expressed in terms of parts by weight relative to the total parts by weight of the following constituents:

100 parts by weight of the urethane prepolymer obtained by condensation of a diene oligomer having hydroxyl endings, optionally mixed with a chain extender, with a polyisocyanate compound in a ratio by weight such that the ratio of the molar concentration of the isocyanate groups (—N=C=O) to the molar concentration of the hydroxyl groups (—OH) is from 0.05 to q, this value q being selected so as not to achieve gelling of the prepolymer, from 1 to 200 parts by weight of acrylate oligomer(s) having a number average molecular mass ranging from 100 to 5000 g/mol, from 1 to 100 parts by weight of acrylate monomer(s), from 0 to 100 parts by weight of plasticizer(s), from 0 to 5 parts by weight of additive(s), and from 0.1 to 5 parts by weight of radical initator.

11. A composition comprising a urethane prepolymer which is stable on storage and which gives an elastomer by thermal or photochemical radical crosslinking, having a content including the following constituents expressed in terms of parts by weight relative to the total parts by weight of the following constituents:

100 parts by weight of the urethane prepolymer obtained by condensation of a diene oligomer having hydroxyl endings, optionally mixed with a chain extender, with a polyisocyanate compound having a molecular weight of about 250 or less in a ratio by weight such that the ratio of the molar concentration of the isocyanate groups (—N=C=O) to the molar concentration of the hydroxyl groups (—OH) is from 0.05 to q, this value q being selected so as not to achieve gelling of the prepolymer, from 1 to 200 parts by weight of acrylate oligomer(s), from 1 to 100 parts by weight of acrylate monomer(s), from 0 to 100 parts by weight of plasticizer(s), from 0 to 5 parts by weight of additive(s), and from 0.1 to 5 parts by weight of radical initator.

* * * * *